United States Patent [19]

Laux

[11] Patent Number: 5,448,946
[45] Date of Patent: Sep. 12, 1995

[54] BOTTLE COMPACTING APPARATUS

[76] Inventor: William R. Laux, 318 Grant St., Phillipsburg, N.J. 08865

[21] Appl. No.: 287,184

[22] Filed: Aug. 8, 1994

[51] Int. Cl.⁶ .................................................. B30B 1/26
[52] U.S. Cl. ........................ 100/249; 100/278; 100/288; 100/902
[58] Field of Search .............. 100/72, 93 R, 246, 249, 100/250, 251, 278, 902, 915; 241/99

[56] References Cited

U.S. PATENT DOCUMENTS

| 730,642 | 6/1903 | Hamilton | 100/278 |
|---|---|---|---|
| 2,817,290 | 12/1957 | Parker | 100/902 |
| 3,688,689 | 9/1972 | Fierle | 100/249 |
| 3,934,498 | 1/1976 | Hochanadel | 100/902 |
| 4,334,469 | 6/1982 | Tanner | 100/902 |
| 5,102,057 | 4/1992 | Ellis . | |

FOREIGN PATENT DOCUMENTS

| 2596688 | 10/1987 | France | 100/92 |
|---|---|---|---|
| 2668732 | 5/1992 | France | 100/92 |
| 2692190 | 12/1993 | France | 100/92 |
| 5104526 | 4/1993 | Japan | 100/92 |
| 8301039 | 3/1983 | WIPO | 100/902 |

Primary Examiner—Timothy F. Simone
Assistant Examiner—Terrence R. Till
Attorney, Agent, or Firm—Kenneth P. Glynn

[57] ABSTRACT

An apparatus for compressing a container having a base and a top. The apparatus includes a housing and a lid which releasibly attaches to the housing. The lid contains a hole or recess to receive the top of a container. The apparatus also includes a shelf which has a top side containing at least one recess adapted to receive the base of the container. The shelf and the lid cooperate to hold the container securely. Additionally, the apparatus may include rods and the shelf may contain orifices to receive the rods. The shelf travels along the rods such that it remains parallel and aligned with the lid. Finally, gears, belts, or handles serve to force the shelf against the lid and thereby crush the container held between the lid and the shelf.

17 Claims, 4 Drawing Sheets

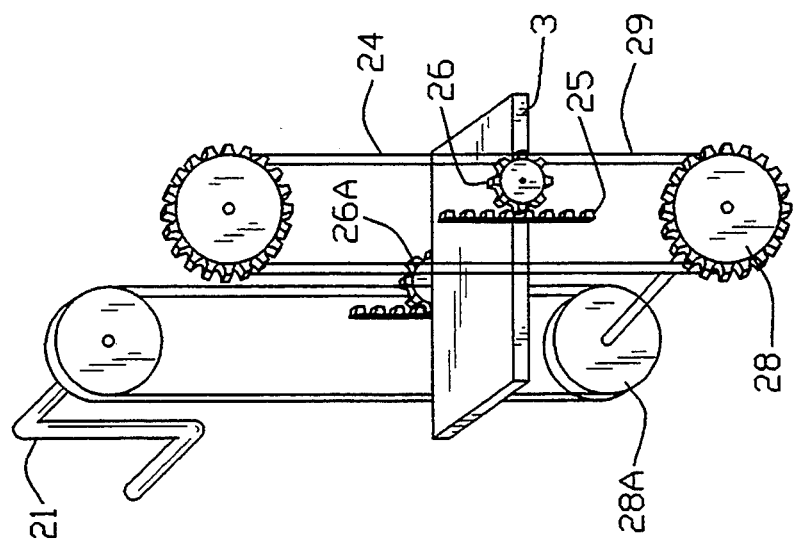
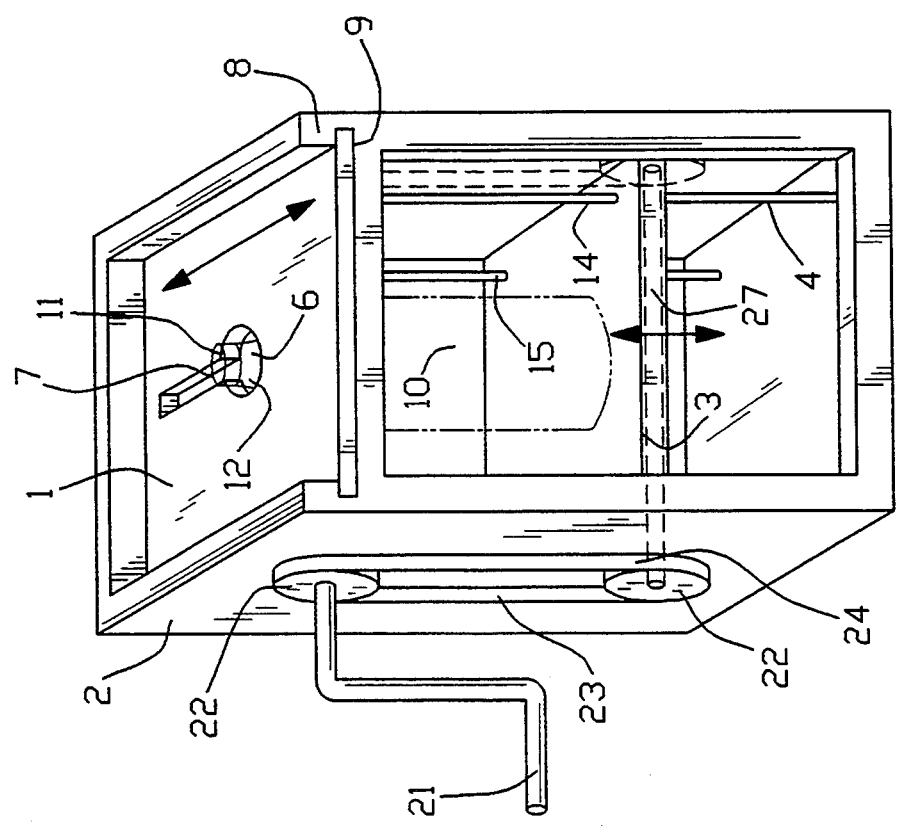
FIG. 2B
FIG. 2A

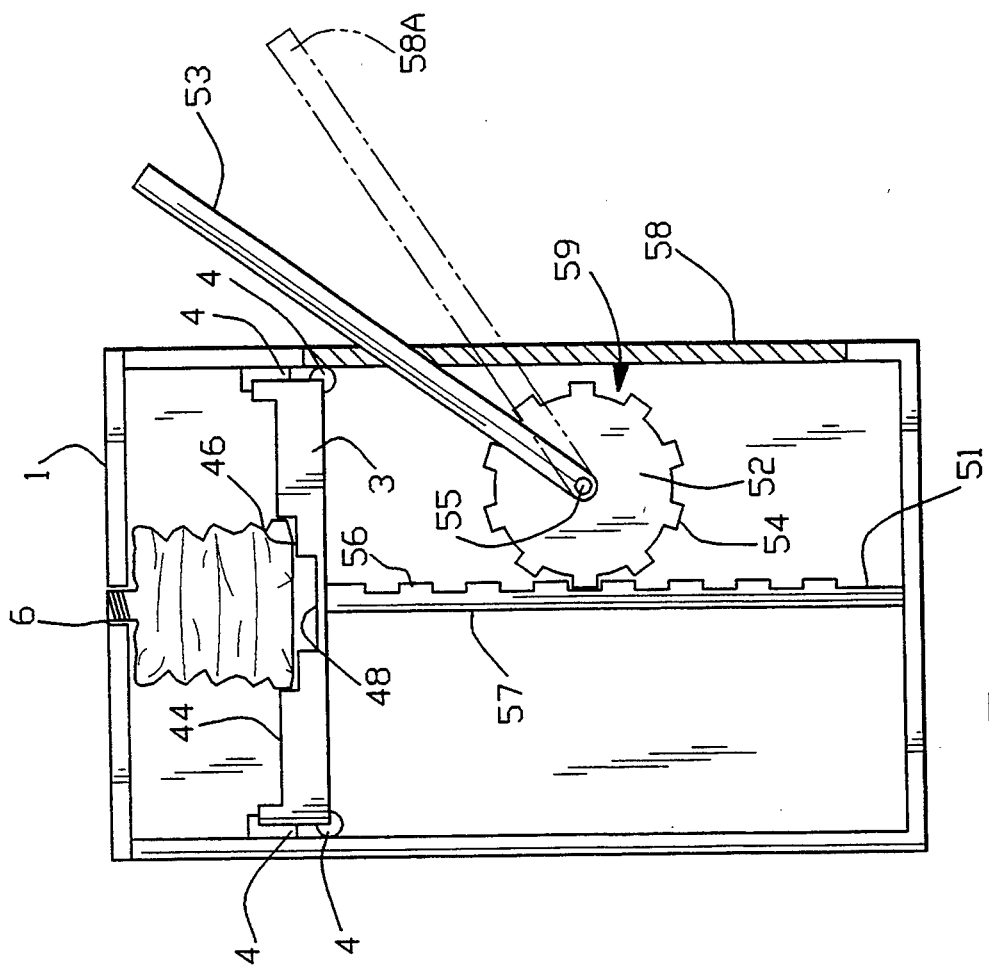
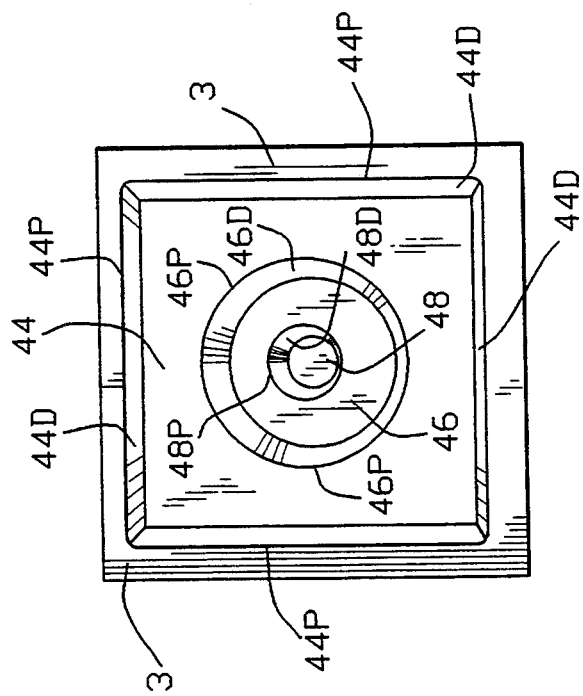
FIG. 5
FIG. 4

5,448,946

BOTTLE COMPACTING APPARATUS

BACKGROUND OF THE INVENTION

1. Field of the Invention

The invention relates generally to a waste compression apparatus and specifically to an apparatus for compacting plastic, paper, and metal containers or bottles.

2. Information Disclosure Statement

Several patents disclose devices used for the reduction of packaging waste. Of particular interest here is U.S. Pat. No. 5,102,057 issued to William H. Ellis, III on Apr. 7, 1992. Ellis discloses a plurality of tapered cylinders having pointed teeth to grip plastic waste. If the pointed teeth successfully grip the plastic waste, then the plastic waste can be compressed by the converging orientation of the plurality of tapered cylinders.

The apparatus disclosed in Ellis presents significant problems concerning the safety of the user and efficiency of the device in compressing plastic. Assume the apparatus in Ellis is used to compress a typical plastic container found in a household. If the plastic container is relatively hard or large as with certain household packaging, then the rotating teeth disclosed in Ellis may be unable to grip the plastic container unless a downward force is applied to the plastic container. If the user must manually apply downward force to the plastic container for proper operation, then the user could be injured by the rotating teeth. Moreover, because Ellis discloses a safety switch which prevents the teeth from rotating when a lid is open, the Ellis machine may be rendered inoperable under certain circumstances.

The plastic compressing apparatus disclosed in Ellis also presents problems of potential down-time. A plastic container to be compressed may bind the rotational movement of the plurality of tapered cylinders and cause the belt to slip. The user must then stop compressing apparatus and remove the object from the tapered cylinders. This again presents a dangerous situation for the user. Thus, operation of the plastic compressing apparatus disclosed in Ellis can be time-consuming, frustrating, and unsafe for the user.

SUMMARY OF THE INVENTION

An apparatus for compressing a container having a base and a top. The apparatus includes a housing and a lid which releasibly attaches to the housing. The lid contains a hole or recess to receive the top of a container. The apparatus also includes a shelf which has a top side containing at least one recess adapted to receive the base of the container. The shelf and the lid cooperate to hold the container securely. Additionally, the apparatus may include rods and the shelf may contain orifices to receive the rods. The shelf travels along the rods such that it remains parallel and aligned with the lid. Finally, gears, belts, or handles serve to force the shelf against the lid and thereby crush the container held between the lid and the shelf.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

FIG. 2a shows a perspective view of a preferred embodiment of the present invention with rods for guiding means and a crack driven crushing means, and FIG. 2b shows a slight variation of the basic mechanism;

FIG. 4 shows a preferred embodiment of the shelf with recesses for standard packaging containers;

FIG. 5 shows a preferred embodiment of the present invention with a rack and pinion for crushing means and rollers and a pole for the guiding means;

DETAILED DESCRIPTION OF THE PRESENT INVENTION

Generally, the present invention can be used to compress a wide variety of packaging waste constructed of materials such as plastics, papers, and soft-metals. Compression of packaging waste permits convenient storage, and transportation to recycling facilities. Specifically, the apparatus may be used to compress household packaging waste. Household packaging waste includes containers associated with beverages, canned foods, and detergents among others. Although these containers are used to hold a variety of substances, a group of "standard containers" exists. Standard containers include one-gallon plastic jugs, two-liter plastic bottles, and twelve and sixteen ounce aluminum cans. The present invention is intended primarily to compress containers, however, its compressing action may lend itself to other applications.

Figure 1:
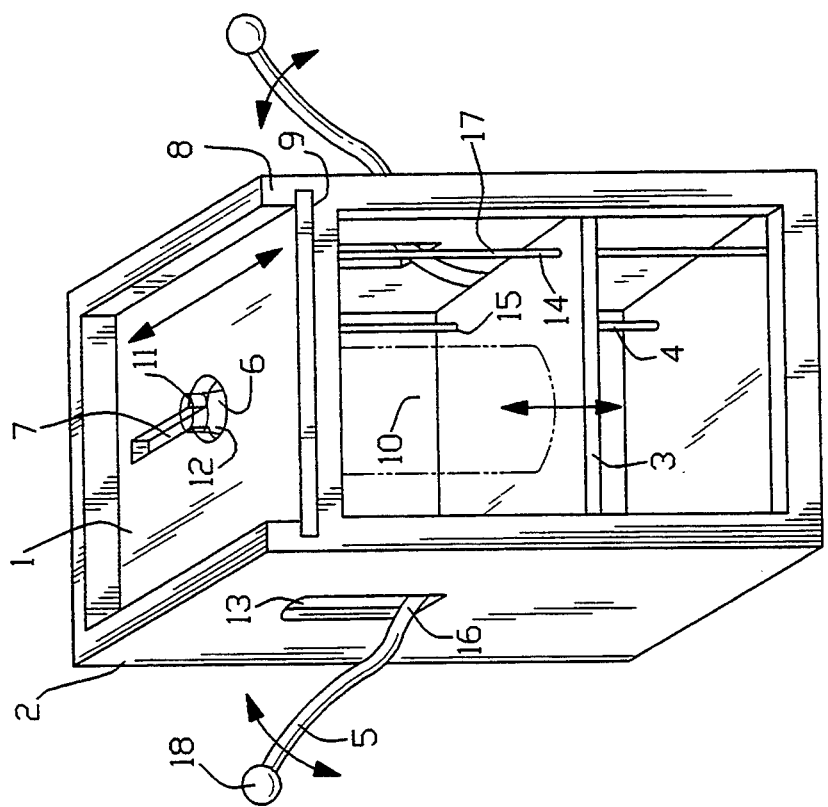
FIG. 1 shows a perspective view of a preferred embodiment of the present invention with rods for guiding means and handles for crushing means.

FIG. 1 shows an embodiment of the present invention. In simple terms, a lid 1 releasibly attaches to a housing 2. Within housing 2, guiding means guides a shelf 3 such that the shelf 3 remains parallel and aligned with the lid 1. The lid 1 and shelf 3 are adapted to hold a container 10. While held in position, crushing means forces the shelf 3 towards the lid 1 thereby crushing the container 10. In this way, the present invention compresses discarded containers to reduce their volume.

The lid 1 can have several preferred embodiments. As show in FIG. 1, it releasibly attaches to the housing 2 by sliding in slot 9. Alternatively, it can be pivotly mounted to the housing 2 and rotate into a closed position or it could be hinged and held in place with a latch. It should be understood, therefore, that any traditional means for securing a lid could be used in the present invention. A basic feature of the lid 1 is to support the top of the container 10 during the crushing process. To this end, the invention has receiving means to stabilize the top of the container 10. The receiving means can assume several different embodiments. In one embodiment, the lid 1 has a hole 6 which is adapted to receive the mouth 11 of the container 10. A slot 7 extends from the hole 6 to the edge of the lid 1. The slot 7 is adapted to receive the neck 12 of the container 10 such that the lid 1 can slide around the neck 12 to close. Alternatively, receiving means may entail screw clamps or spring clamps on the lid 1. Additionally, lid 1 may contain a pliable collar 14 to protect the neck and mouth of the container 10. By protecting the neck and mouth and essentially removing these parts from the crushing process, the cap to the container can be reattached to the mouth after the container is crushed. Re-sealing the containers will prevent leakage and minimize the attraction of pests. This feature represents a major advantage over the prior art.

The base of the container 10 is secured by a recess in the shelf 3 as depicted in FIG. 4. This particular embodiment includes several recesses: a first recess 48, a second recess 46, and a third recess 44. The first recess 48 has a first perimeter 48P and first depth 48D corresponding in size to a standard twelve-ounce aluminum can. The second recess 46 has a second perimeter 46P and a second depth 46D corresponding in size to a standard two-liter plastic bottle. The third recess 44 has a third perimeter 44P and a third depth 44D corresponding in size to a standard one-gallon plastic jug. In yet another embodiment, the shelf 3 may include a screw clamp or a spring clamp to secure the base of the container. The preferred embodiment of the shelf 3 may also have a seal 40 that abuts against the housing 2 preventing fragments of dirt, dust, and reside from the containers from contaminating the crushing means and guiding means. Such seals can be made of synthetic rubber in accordance with known methods to provide for a strong but flexible seal.

Figure 3:
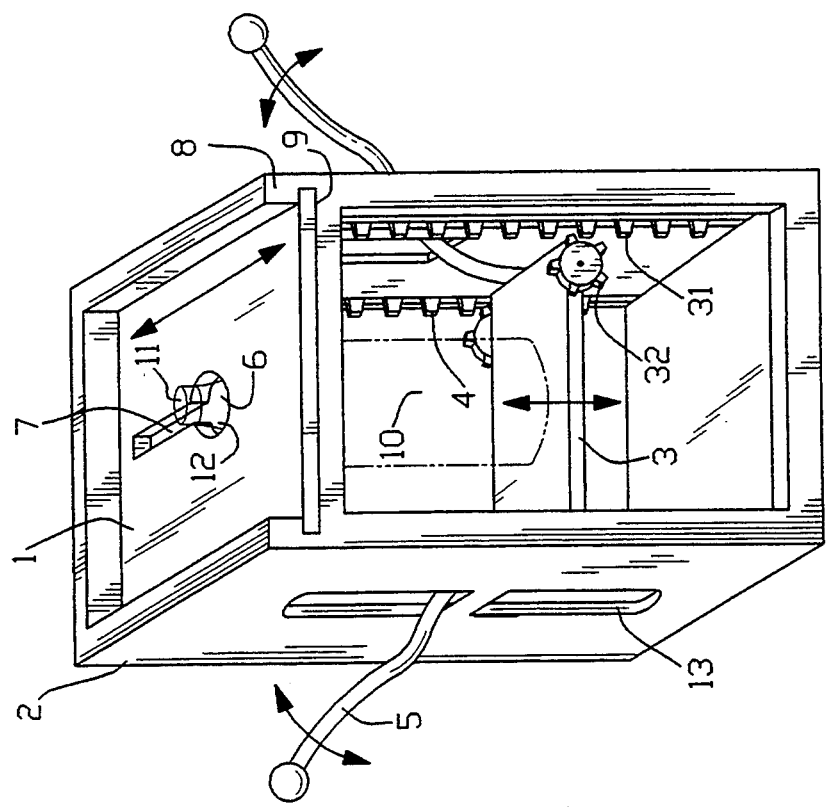
FIG. 3 shows a perspective view of a preferred embodiment of the present invention with a rack and pinion for guiding means and handles for crushing means.

The guiding means in the present invention can assume a variety of embodiments. Maintaining the shelf's parallel orientation relative to the lid 1 while crushing the container is essential to achieve an even compression. As shown in the embodiment of FIG. 1, the guiding means comprises rods 14 and corresponding orifices 15 in the shelf 3. As the shelf 3 moves up and down, it is guided by the rods 14 which pass through the orifices 15. Therefore, the rods 25 hold the shelf 3 parallel and in alignment with lid 1. Instead of orifices, wheels can be mounted to the shelf 3 to ride along the rods. Another preferred embodiment of the guiding means is shown in FIG. 3. There, guiding means consists of a rack 31 and a pinon 32. The rack 31 is mounted to the housing 2 and the pinion is mounted to the shelf 3. As the shelf 3 is moves up the housing 2 towards the lid 1, the pinion 32 rotates along the rack 31 and guides the shelf 3. Still another embodiment of the guiding means is shown in FIG. 5. There, a pole 51 is coaxially disposed within a rack 57 such that the rack 57 is capable of unimpeded vertical motion while being incapable of horizontal motion. This embodiment of the guiding means may be used in combination with a plurality of rollers. The rollers are affixed to the movable shelf 30 and movably contact the housing 10. Although this disclosure discusses several preferred embodiments of the guiding means, it should be noted that any traditional means of guiding a platform will work.

The crushing means 5 may also assume a variety of embodiments. As shown in FIG. 1, the crushing means comprises a set of handles 5 having a first end 17 and a second end 18. To accommodate the handle 5, the housing 2 has a slot 13 of a suitable size to permit the handle to be moved freely. The handle 5 is pivotly attached to the shelf 3 at the first end 17 and positioned to impact the housing 2 at a lever point 16. The distances between the first end 17 and the lever point 16 and the lever point 16 and the second end 18 establishes a lever arm. This lever provides the user with a mechanical advantage when compacting the container. FIG. 2 shows another embodiment in which the crushing means 5 consists of sheaves 22 mounted to the housing 2, connecting means 23 linking the sheaves together, and a hand crank 21 operatively connected to the sheaves 23. By turning crank 21, sheaves 22 rotates which in turn causes the connecting means 23 to move. Connecting means 23 may comprises any known means for connecting sheaves such as a belt or chain. Because connecting means 23 is attached to the shelf 3 by engaging means 24, the shelf moves with the belt 23. This allows a user to force shelf 3 towards lid 1 and thereby crush container 10. A mechanical advantage can be gained by having a large lever arm on the crank 21 and/or a large radius on sheaves 22.

To prevent the shelf 3 from binding in the rods 4, another set of sheaves and connecting means can be mounted on the opposite side of the housing 2. An axle 27 can be used to connect two sheaves such that turning hand crank 21 will turn both mechanism at the same rate. This will provide for the uniform elevation of the shelf 3 and minimize binding.

FIG. 2b shows a slight variation of this basic embodiment. Here, instead of sheaves and a belt, sprockets 28 and a chain 29 are used. Moreover, the engaging means comprises a rider pinion 26 which engages a rack 25. In one embodiment, the rider pinion 26 is attached to the shelf 3 and the rack is mounted to the housing 2. Alternatively, the rack 25 can be secured to the shelf 3 and the rider pinion mounted to the housing 2. In either case, as the sprockets 28 turn and move chain 29, the pinion 26 rotates. This rotating motion moves the pinion 26 relative to the rack 25. In the former embodiment, the rack 25 remains stationary and the pinion which is attached to the shelf 3 moves. In the latter embodiment, the pinion remains stationary and the rack 25 which is attached to the self 3 moves. The former embodiment does, however, offer the advantage of connecting the rider pinions 28 and 28A on each side of the shelf 3. By connecting these pinions with an axle the uniform movement of the shelf is improved.

Figure 6:
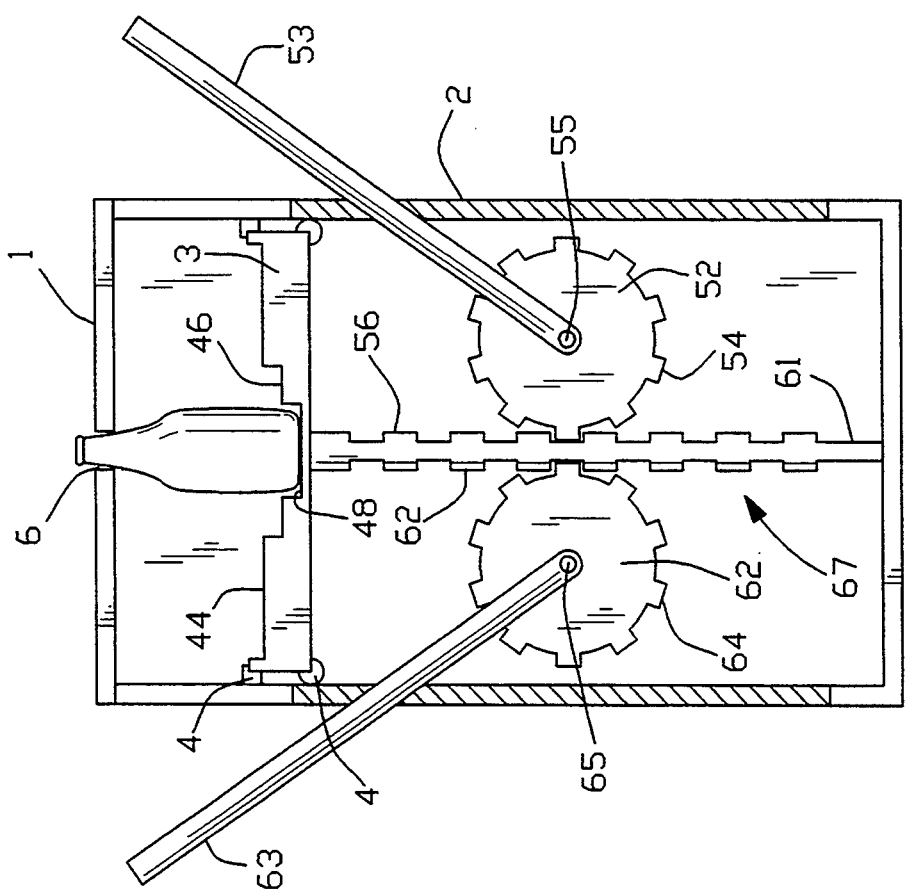
FIG. 6 shows an embodiment similar to FIG. 5 but with two handles and corresponding gears.

Other embodiments may use a rack and pinons assembly. For Example, in FIG. 5 a gear assembly 59 has a first shaft 55, a first pinion 52, and a rack 57. The first shaft 55 is rotatably mounted to the housing 2. The first pinion 52 is disposed about the first shaft 55. The first pinion 22 has teeth which mesh with rack 57. An alternate embodiment is depicted in FIG. 6 and features a second pinion 62, and a rack 62 which has rack teeth on two sides. The second shaft 65 is rotatably mounted on the housing 2. Both the first pinion 52 and the second pinion 62 have pinion teeth which mesh with the rack. The first and second pinions are attached to handles 53 and 63 respectively. The lever arm of the handles and the gear ratio of the rack and pinions provide the user with a substantial mechanical advantage in this embodiment.

Figure 7:
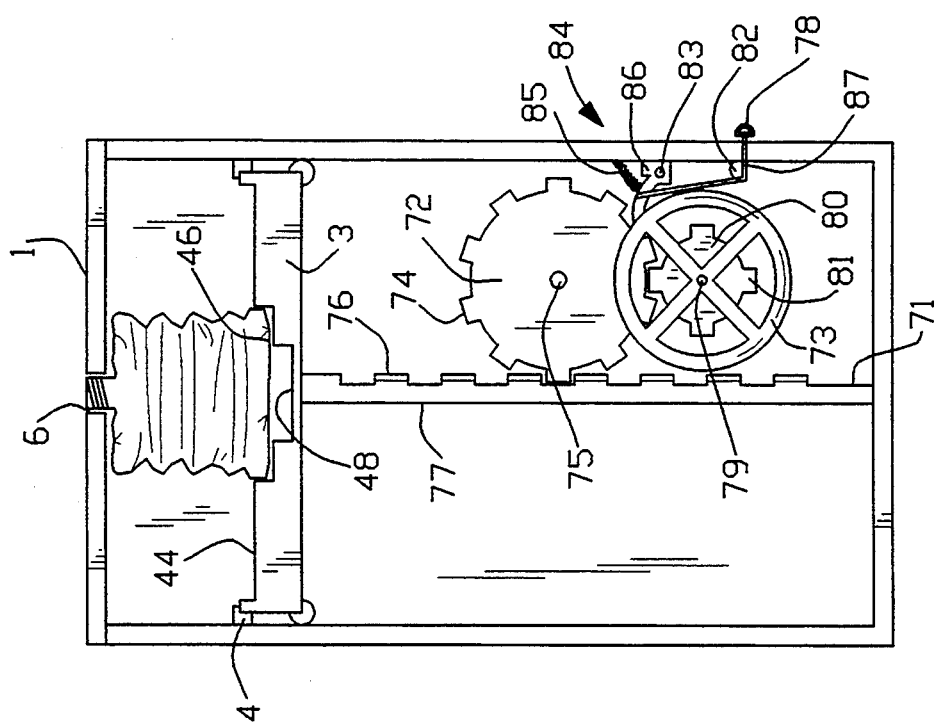
FIG. 7 shows an embodiment which uses a rachet action.

Another embodiment using several gears to achieve a mechanical advantage as shown in FIG. 7. FIG. 7 is designated as the ratchet embodiment. The ratchet embodiment has additional features compared to the preferred embodiment of FIG. 1. The ratchet-embodiment has a drive handle 73, a drive gear 80, an alpha shaft 79, and a ratchet assembly 84. The drive handle 73 enables the user to rotate the drive gear 80. The drive gear 80 has a drive gear diameter which is less than the first pinion gear diameter. The teeth of the drive gear mesh with the pinion teeth 21. The drive handle 73 may be elongated relative to the alpha shaft 79 to provide for greater leverage.

The ratchet assembly 84 consists of a pawl 86 which is rotatably mounted on a pivot point 83. The pivot point 83 is affixed to the housing 2. The ratchet assembly has a spring 85 to keep the pawl 86 under tension such that it prevents the first pinion 72 from rotating counter clockwise according to FIG. 7. Thus, the combination of the spring 85 exerting tension on the pawl 86 and the pawl 86 contacting the housing 2 allows only unidirectional movement of the first pinion 72.

The ratchet assembly 84 has a release cable 87 with a first end and a second end. The first end is rotatably attached to the pawl 76. The second end is attached to the release handle 78. In one embodiment, the release handle 78 is located outside the housing 2. If the user pulls on the release handle 78, then the first pinion 72 is free to rotate clockwise or counterclockwise.

Obviously, numerous modifications and variations of the present invention are possible in light of the above teachings. It is therefore understood that within the scope of the appended claims, the invention may be practiced otherwise than as specifically described herein.

What is claimed is:

1. An apparatus for compressing a container having a base and a top, said apparatus comprising:
    a) a housing, said housing having a top and a bottom and an open front and being adapted to receive a container having a base and a top;
    b) a lid, said lid being releasably attached to said housing, said lid containing a receiving means to receive a top of a container;
    c) a shelf, said shelf having a top side containing at least one recess adapted to receive a base of a container, said shelf being movably located within said housing, said shelf and said lid cooperating to hold said container securely;
    d) guiding means, said guiding means being connected to said shelf and to said housing such that said shelf is vertically movable and is held parallel to and aligned with said lid; and,
    e) crushing means, said crushing means being operably connected to said shelf for moving said shelf vertically and forcing said shelf against said lid, thereby crushing a container when a container is held between said lid and said shelf and said crushing means is operated.

2. The apparatus of claim 1 wherein said receiving means comprises a hole, said hole being adapted to receive the top of a container having a predetermined diameter wherein said container is selected from the group consisting of two-liter plastic bottles, one-gallon plastic jugs, twelve ounce cans and sixteen ounce cans.

3. The apparatus of claim 2 wherein said lid has a plurality of edges and also has a slot which extends from said hole to one of said plurality of edges of said lid, said slot adapted to receive a neck of a container such that said slot and hole of said lid can slide about a neck of a container.

4. The apparatus of claim 1 wherein said shelf contains a multiplicity of recesses corresponding to predetermined base sizes of a multiplicity of containers having different predetermined base sizes.

5. The apparatus of claim 4 wherein said recesses include a first recess, a second recess and a third recess, said first recess having a first diameter corresponding to a base of a twelve-ounce metal can, said second recess having a second diameter corresponding to a base of a two-liter plastic bottle, and said third recess having a third diameter corresponding to a base of a one-gallon plastic jug.

6. The apparatus of claim 1 wherein said shelf has a plurality of edges and further includes a seal, said seal being affixed to said plurality of edges of said shelf such that said shelf forms a barrier between said housing and said shelf, said seal preventing debris from said container from fouling said device.

7. The apparatus of claim 1 wherein said guiding means comprises a plurality of rods, and a plurality of orifices in said shelf to receive said rods, said rods being positioned substantially perpendicular to said lid, said plurality of orifices being adapted to slide along said rods to hold said shelf substantially parallel and aligned with said lid when said crushing means is operated to move said shelf and said lid together.

8. The apparatus of claim 1 wherein said guiding means comprises at least one rack and at least one pinion wherein said at least one rack is mounted to said housing and said at least one pinion is mounted to said shelf, said at least one pinion rotating along a rack and guiding said shelf when said crushing means is operated to move said shelf toward said lid.

9. The apparatus of claim 1 wherein said crushing means comprises a multitude of sheaves mounted to said housing, a connecting means for connecting said sheaves, an engaging means for connecting said shelf to said connecting means, and a hand crank for rotating said sheaves so as to move said shelf toward said lid.

10. The apparatus of claim 9 wherein said connecting means is a chain.

11. The apparatus of claim 9 wherein said connecting means is a belt.

12. The apparatus of claim 1 wherein said crushing means comprises a multitude of sprockets mounted to said housing, a hand crank for rotating said sprockets, a chain for connecting said sprockets, a rider pinion mounted to said shelf and engaging said chain such that movement of said chain causes said rider pinion to rotate, and a rack mounted to said housing such that said rider pinion and said rack cooperate as a rack and pinion assembly causing said shelf to move as said chain moves.

13. The apparatus of claim 1 wherein said crushing means comprises a handle having a first end and a second end, said handle is connected to said shelf at said first end and impacts said housing at a lever point at a predetermined distance from said first end such that a lever arm is established between said first end and said lever point and said lever point and said second end for movement of said shelf toward said lid.

14. The apparatus of claim 1 wherein said crushing means comprises a gear assembly, said gear assembly being disposed within said housing, said gear assembly having a first shaft, a first pinion, a second shaft, a second pinion and a rack, said first and second shafts being rotatably mounted to said housing, said first and second pinions being disposed about said first and second shafts respectively, said rack having rack teeth on both sides, said rack being connected to said shelf, said first and second pinions cooperating with said rack, said first and second pinions having first and second handles operably connected thereto, respectively.

15. The apparatus of claim 1 wherein said crushing means comprises a gear assembly, said gear assembly being disposed within said housing, said gear assembly having an alpha shaft, a drive gear, a first shaft, a first pinion, and a rack, said alpha shaft being rotatably mounted to said housing, said drive gear being disposed about said alpha shaft, said drive gear having drive teeth, said first shaft being rotatably mounted to said housing, said first pinion being disposed about said first shaft, said first pinion being affixed about said first shaft, said rack being connected to said shelf, said first pinion having pinion teeth, said drive teeth and said pinion teeth being adapted to engage one another, at least one of said drive teeth meshing with at least one of said pinion teeth, said rack having rack teeth on at least one side of said rack, said rack teeth and said pinion teeth being adapted to engage one another for movement of said shelf toward said lid.

16. The apparatus of claim 15 wherein said drive gear has a predetermined drive gear diameter and said first pinion gear has a predetermined first pinion gear diameter and wherein said predetermined drive gear diameter is less than said predetermined first pinion gear diameter.

17. The apparatus of claims 15 wherein said drive handle is elongated relative to said alpha shaft such that a leveraged force may be applied through said drive handle to rotate said alpha shaft.

* * * * *